July 1, 1969 I. F. ORRELL, JR 3,453,451
QUENCH CIRCUIT
Filed Dec. 14, 1966
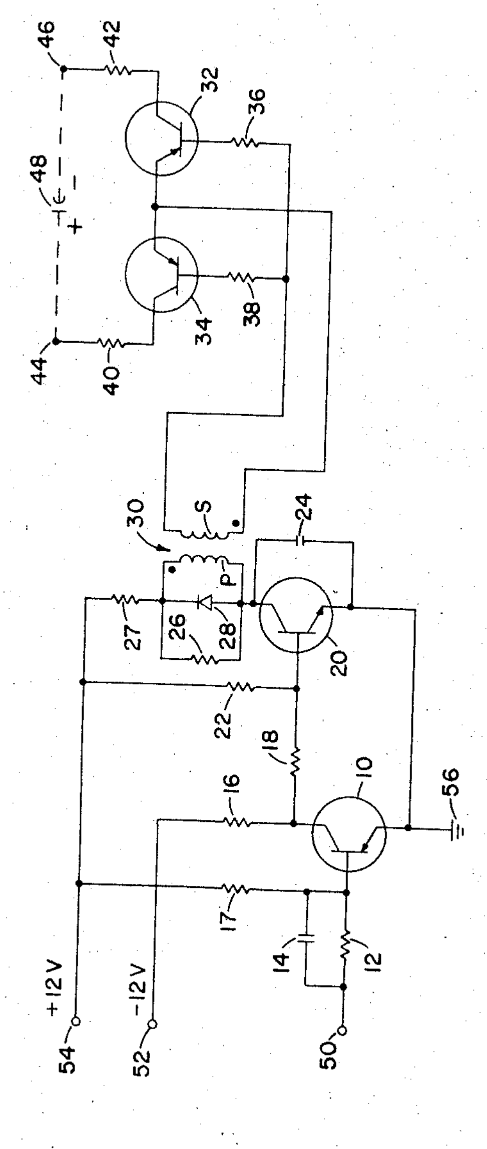
Irving F. Orrell Jr.
INVENTOR.
Harry M. Saragovitz
BY Edward J. Kelly
Herbert Berl
Alfred E. Smith United States Patent Office 3,453,451
Patented July 1, 1969

3,453,451
QUENCH CIRCUIT

Irving F. Orrell, Jr., Whitinsville, Mass., assignor, by mesne assignments, to the United States of America as represented by the Secretary of the Army Filed Dec. 14, 1966, Ser. No. 601,811
Int. Cl. H03k 17/60
U.S. Cl. 307—254 3 Claims

ABSTRACT OF THE DISCLOSURE

A switching circuit for rapidly discharging a capacitor bank. Immediately prior to receipt of a charging current across the capacitors, the preceding residual charge is rapidly bled off by a circuit that appears as an open circuit when the charging current is applied. A first pair of transistors is connected in parallel with the capacitor bank. A transformer connects the pair and isolates them from another pair of transistors that respond to an input signal to activate the circuit prior to the charging current being applied to the capacitors. Current flowing through the transformer is coupled to the secondary and activates the first pair of transistors to bleed the capacitors. After a predetermined time the transistors are deenergized and appear as an open circuit when the charging current is applied to the capacitors.

This invention relates generally to switching circuits and more particularly to a quenching circuit for removing a charged condition from a capacitor or bank of capacitors.

In a radar system having operational amplifier integrators, the integrating capacitors therein have a residual voltage remaining after each input video signal. The voltage levels achieved by the integrators are eventually encdoded by an analog-to-digital converter. Succeeding voltage levels achieved by the integrators are altered from the voltage level applied to a new level by the amount of residual voltage remaining on the integrating capacitors, which results in misleading information being encoded in the analog-to-digital converter. To minimize the deleterious effect of the residual voltage a circuit is provided which will discharge the capacitors during inactive periods and appear as an effective open circuit during active periods.

An object of this invention is to provide a quench circuit for use with a radar system.

Another object of this invention is to provide a means for controlling the residual voltage level of the integrating capacitors in an amplifier integrator.

A further object of this invention is to provide a means for discharging amplifier integrating capacitors.

Other objects and features of the invention will be apparent from the following detailed description of a preferred embodiment of the invention and from the accompanying drawing illustrating an example of the invention and wherein:

The single figure shows a schematic diagram incorporating a suitable embodiment of the invention.

Referring now to the single figure, there is shown a first transistor 10 having the base thereof connected through a resistor 12 and a capacitor 14 to a signal input terminal 50. A negative biasing potential is supplied through a terminal 52 and a current limiting resistor 16 to the collector of transistor 10. The base of transistor 10 is also connected through a resistor 17 to a positive voltage terminal 54. The emitter of transistor 10 is connected to a circuit ground 56. The input to the quench circuit is a negative going pulse possessing standard levels of approximately 0 to −3.0 volts. The pulse to input terminal 50 is supplied 4.0 microseconds prior to receipt of a video pulse for integration, and it is 3.0 microseconds in duration. This 3.0 microsecond pulse turns on transistor 10 which develops a signal across a resistor 18 to turn on a second transistor 20.

The base of transistor 20 is connected through a resistor 22 to positive voltage terminal 54, and is also connected through the resistor 18 to the collector of transistor 10. The emitter of transistor 20 is connected to ground 56 and also through a capacitor 24 to the collector of transistor 20. The collector of transistor 20 is connected to one side of a parallel network consisting of a resistor 26, a diode 28 and the primary side P of a transformer 30. The other side of the parallel network is connected through a resistor 27 to the positive voltage terminal 54. Diode 28 serves to limit the collector voltage developed across transistor 20 due to the back electromotive force developed across the transformer during turn-off periods of transistor 20. When transistor 20 is activated, current flow is induced in primary P of pulse transformer 30 and supplies base current from the transformer secondary S to a third transistor 32 and a fourth transistor 34.

The emitter of transistor 32 is common to the emitter of transistor 34 and is connected to one side of secondary S of transformer 30. The other side of transformer secondary S is connected through a resistor 36 to the base of transistor 32 and through a resistor 38 to the base of transistor 34. The collector of transistor 34 is connected through a resistor 40 to a first output terminal 44. The collector of transistor 32 is connected through a resistor 42 to a second output terminal 46. The integrating capacitors 48 (the system load) are connected between terminals 44 and 46.

The quench circuit input signal (command pulse) is supplied 4 microseconds prior to receipt of a video signal to be processed by the operational amplifier integrator. The negative going command pulse is supplied to terminal 50 and activates transistor 10 which in turn activates transistor 20. Activation of transistor 20 induces current flow in primary P of transformer 30 which supplies base currents to transistors 32 and 34 through the secondary winding S of transformer 30. Regardless of the residual charge polarity across capacitor 48, there is no current flow through transistors 32 and 34 and capacitor 48 prior to the flow of current in transformer secondary S. If a positive voltage exists across integrating capacitor 48 (as shown in the figure) prior to receipt of the quench circuit input pulse, transistor 34 is reverse biased by the positive voltage on the collector thereof and insures that capacitor 48 cannot discharge therethrough. If a negative voltage exists across integrating capacitor 48 (opposite polarity to that shown in the figure) prior to receipt of the quench circuit input pulse, transistor 32 is reverse biased and insures that capacitor 48 cannot discharge therethrough. After receipt of a commond pulse at terminal 50, the base current applied from the secondary S of transformer 30 to transistors 32 and 34 allows conduction thereof and thereby allows the capacitors to discharge through the external quench circuit transistors 32 and 34. The quench circuit is active for only 3 microseconds and will be inactivated 1 microsecond prior to receipt of a video signal by the operational amplifier integrator.

The quench circuit reduces the residual voltage on the integrating capacitors to an insignificant value, thereby allowing more accurate information to be encoded by the analog-to-digital converter.

Although the preferred embodiment of the invention has been described, it will be obvious to those skilled in the art that various changes and modifications may be made without departing from the true spirit and scope of this invention.

What is claimed is:

1. A quench circuit for removing residual voltages, comprising: first, second, third, and fourth transistors, each having a base, emitter and collector electrode; a signal input terminal connected to the base of said second transistor; a first output terminal connected to the collector of said fourth transistor; a second output terminal connected to the collector of said third transistor; the base of said first transistor being connected through a resistor to the collector of said second transistor; the emitter of said first and second transistors being connected in common to a ground; a positive voltage source connected to the base of said first and second transistors; a negative voltage source connected through a resistance to the collector of said second transistor; and coupling means including a transformer having a primary and secondary, the primary being connected on one side to the collector of said first transistor and on the other side to said positive voltage source, and the secondary being connected on one side to the bases of said third and fourth transistors and on the other side to the emitters of said third and fourth transistors.

2. The quench circuit as set forth in claim 1, further comprising a parallel connected resistor and capacitor connected between the base of said second transistor and the signal input terminal; a parallel connected resistor and diode connected across the primary of said transformer; and a capacitor connected between the collector and emitter of said first transistor; and a capacitive load connected between said first and second output terminals for discharging therethrough.

3. The quench circuit as set forth in claim 2 wherein said capacitive load is an integrating capacitor.

References Cited

UNITED STATES PATENTS

| | | | |
|---|---|---|---|
| 2,976,431 | 3/1961 | Richards | 307—254 |
| 3,119,064 | 1/1964 | Hillis | 307—254 XR |
| 3,293,495 | 12/1966 | Smith | 307—254 XR |
| 3,322,968 | 5/1967 | Dennis | 307—254 XR |

ARTHUR GAUSS, *Primary Examiner.*

JOHN ZAZWORSKY, *Assistant Examiner.*

U.S. Cl. X.R.

307—246; 320—1